(12) United States Patent
Lindenau et al.

(10) Patent No.: US 7,524,352 B2
(45) Date of Patent: Apr. 28, 2009

(54) COMPOSITION FOR THE PRODUCTION OF SINTERED MOLDED PARTS

(75) Inventors: Rene Lindenau, Radevormwald (DE); Klaus Dollmeier, Schwelm (DE); Volker Arnhold, Wuppertal (DE)

(73) Assignee: GKNM Sinter Metals GmbH, Radevormwald (DE)

( * ) Notice: Subject to any disclaimer, the term of this patent is extended or adjusted under 35 U.S.C. 154(b) by 0 days.

(21) Appl. No.: 11/089,110

(22) Filed: Mar. 24, 2005

(65) Prior Publication Data

US 2005/0226760 A1 Oct. 13, 2005

Related U.S. Application Data

(63) Continuation of application No. PCT/EP03/09737, filed on Sep. 3, 2003.

(30) Foreign Application Priority Data

Sep. 24, 2002 (DE) ................. 102 44 486

(51) Int. Cl.
*B22F 1/00* (2006.01)
*B22F 3/00* (2006.01)
*C01M 107/22* (2006.01)

(52) U.S. Cl. .............. 75/252; 75/231; 75/246; 75/249; 508/120; 501/1

(58) Field of Classification Search .......... 75/252, 75/231, 246, 249; 508/120, 579, 583; 501/1
See application file for complete search history.

(56) References Cited

U.S. PATENT DOCUMENTS

| | | | | |
|---|---|---|---|---|
| 3,410,684 A | * | 11/1968 | Printz | 419/2 |
| 3,442,837 A | * | 5/1969 | Brotz et al. | 524/278 |
| 4,483,905 A | * | 11/1984 | Engstrom | 428/570 |
| 4,595,558 A | * | 6/1986 | Baldwin et al. | 419/66 |
| 5,258,151 A | | 11/1993 | Bayer et al. | 264/63 |
| 5,298,055 A | * | 3/1994 | Semel et al. | 75/252 |
| 5,380,179 A | | 1/1995 | Nishimura et al. | 419/36 |
| 5,538,684 A | | 7/1996 | Luk | |
| 5,860,055 A | * | 1/1999 | Hesse et al. | 419/36 |
| 6,005,037 A | | 12/1999 | Scheckenbach et al. | 524/278 |
| 6,224,823 B1 | * | 5/2001 | Lindenau et al. | 419/36 |
| 2004/0079192 A1 | * | 4/2004 | Poszmik et al. | 75/252 |

FOREIGN PATENT DOCUMENTS

| | | |
|---|---|---|
| CN | 1289073 A | 3/2001 |
| DD | 269333 | 6/1989 |
| WO | WO 01/91955 A1 | 12/2001 |

OTHER PUBLICATIONS

Klemm, U.; Sobek, D. and Forster, E. "Evaluation of New Types of Lubricants by an Intrumented Compacting Tool", Advances in Powder Metallurgy & Particulate Materials (1993), (vol. 2, compaction, Sintering and Secondary Operations), 51-61.*

* cited by examiner

*Primary Examiner*—Roy King
*Assistant Examiner*—Ngoclan T Mai
(74) *Attorney, Agent, or Firm*—Woodcock Washburn LLP

(57) ABSTRACT

Certain preferred embodiments of the present invention relate to compositions for the production of sintered molded parts, components/parts produced therefrom, and methods for preparing such compositions. In accordance with certain embodiments, compositions for production of sintered molded parts comprise a metal-based, a ceramic-based, and/or a polymer-based powder, and a compaction aid, having 25 to 60 weight percent of a polyglycol, based on the total weight of the compaction aid, and 40 to 75 weight percent of a montan wax, based on the total weight of the compaction aid. The compaction aid may be present in an amount from about 0.1 to 5 weight percent, preferably 0.5 to 1.5 weight percent, based on the total weight of the composition. The composition may also include a lubricant such as, for example, $MoS_2$, $WS_2$, BN, MnS, and/or carbon.

31 Claims, No Drawings

COMPOSITION FOR THE PRODUCTION OF SINTERED MOLDED PARTS

CROSS-REFERENCE TO RELATED APPLICATIONS

This application is a continuation of International Application No. PCT/EP/2003/09737 filed Sep. 3, 2003, which claims priority to German Application No. 102 44 486.2-44 filed Sep. 24, 2002, each of which is hereby incorporated by reference in its entirety.

FIELD OF THE INVENTION

The present invention relates to compositions for the production of sintered molded parts, components/parts produced therefrom, and methods for preparing such compositions. The compositions, components, and methods described herein are especially suitable for use in the automobile industry.

BACKGROUND OF THE INVENTION

Sintered molded parts have a wide variety of industrial applications such as automobile manufacturing where any number of molded engine and/or transmission parts can be manufactured by a variety of molding and sintering techniques. One of the recognized difficulties involved in the production of sintered molded parts is their production with the highest possible density. A molded part may be pressed or compacted in one or more layers from a sinterable powder by those standard powder metallurgy (P/M) methods known in the art. This molded part, referred to as a green compact, may then be sintered, generally under a protective atmosphere, to obtain a strong and dimensionally accurate molded metal part.

The density of sintered molded parts produced by those methods known in the art depends essentially on the density of the green compact produced in the first compaction step, i.e., the green density (compact density). Therefore, it is desirable to produce green compacts in the compaction step that have a density that is as high as possible. However, the high compaction pressures usually used in the those methods known in the art may result in high wear of the die itself and increased ejection sliding friction of the finished green compact. As a result, higher ejection forces must be applied, thereby correspondingly increasing wear of the die. Furthermore, higher ejection forces increase the risk of undesired localized after-compaction and cracking of the green compact. Therefore, there is a need in the art for a composition that, when compacted, possesses high green strength and green density. Still further, there is a need for a composition that will exhibit lower ejection forces and reduce the risk of undesirable high wear of the die.

SUMMARY OF THE INVENTION

The present invention relates to compositions for the production of sintered molded parts, components produced therefrom, and methods for preparing such compositions. In accordance with certain presently preferred embodiments of the present invention, compositions for the production of sintered molded parts comprise a metallic, ceramic, and/or polymer material and a compaction (e.g., pressing) aid, having 25-60 wt. % of a polyglycol, based on the total weight of the compaction aid, and 40-75% of a montan wax, based on the total weight of the compaction aid.

Metallic, ceramic, and/or polymer materials in accordance with this invention are especially powders or compositions of metallic, ceramic, and/or polymer components, for example, compositions of steels, such as chromium-nickel steels, bronzes, nickel-base alloys such as Hastelloy, Inconel, metal oxides, nitrides, silicides, or the like, as well as aluminum-containing powders and compositions. The compositions can also contain high-melting components, such as platinum or the like. The powder that is used and its particle size depend on the specific purpose intended. Preferred iron-containing powders are the alloys 316L, 304L, Inconel 600, Inconel 625, Monel, and Hastelloy B, X, and C.

DETAILED DESCRIPTION OF ILLUSTRATIVE EMBODIMENTS

The present invention relates to compositions for the production of sintered molded parts, components/parts produced therefrom, and method for preparing such compositions. In accordance with certain presently preferred embodiments of the present invention, compositions for the production of sintered molded parts comprise a metallic, ceramic, and/or polymer material and a compaction (e.g., pressing) aid, having 25-60 wt. % of a polyglycol, based on the total weight of the compaction aid, and 40-75% of a montan wax, based on the total weight of the compaction aid.

Metallic, ceramic, and/or polymer materials in accordance with this invention are especially powders or compositions of metallic, ceramic, and/or polymer components, for example, compositions of steels, such as chromium-nickel steels, bronzes, nickel-base alloys such as Hastelloy, Inconel, metal oxides, nitrides, silicides, or the like, as well as aluminum-containing powders and compositions. The compositions can also contain high-melting components, such as platinum or the like. The powder that is used and its particle size depend on the specific purpose intended. Preferred iron-containing powders are the alloys 316L, 304L, Inconel 600, Inconel 625, Monel, and Hastelloy B, X, and C. Furthermore, the metallic and/or polymer material can consist wholly or partly of milled fibers or fibers, preferably fibers with diameters of from 0.1 to 2 µm and lengths of up to 50 mm.

In the context of the present invention, sintered molded parts are understood to include molded parts that have been produced in whole, or in part, from a sinterable material. Thus, certain aspects of the present invention are understood to be useful in the compaction and/or sintering of composite parts. The main component of such a composite part can be produced, for example, from an aluminum-containing or iron-containing composition, and the other component joined with the main component can be produced from any number of different materials, for example, cast steel, sintered or massive, or massive cast aluminum. The composite part can also have a sintered layer that consists, for example, of an aluminum-containing or ceramic-containing composition, for example, only on its end faces or on its surface, whereas the main component is, for example, steel or cast iron, sintered or massive. The sintered molded parts can be sized and/or age-hardened.

Montan waxes in accordance with this invention are bitumens of lignite that were formed from resins, waxes, and fats of plants from the Tertiary geological period. They are composed of esters of so-called montan acids (fatty acids) with long-chain wax alcohols, especially $C_{20}$-$C_{36}$ fatty acid esters, and preferably $C_{24}$-$C_{34}$ fatty acid esters. In addition to these components, montan wax can also contain additional free fatty acids and free wax alcohols as well as montan resins, ketones, and asphalt-like material. Montan waxes are generally compositions of various fatty acid esters. Preferred montan waxes have an acid value (mg KOH/g) in the range of 5-30, and preferably 10-25, and/or a saponification number (mg KOH/g) in the range of 100-200, and preferably 120-160. The viscosity (m•Pas) at 100° C. is preferably in the range of 10 to 40, and even more preferably 15 to 35.

The inventors have surprisingly found that the addition of the compaction (e.g., pressing) aid defined above to a sinterable material in the metallurgical compaction process makes it possible to produce green compacts having significantly increased values of green strength and green density, especially at a die temperature of room temperature, and which also require considerably lower ejection forces for the removal of the green compacts from the die. This not only significantly reduces the wear of the die that is used, but also reduces the danger of cracking or localized after-compaction of the green compact that is produced. Furthermore, the green densities that can be produced with the composition of the invention are increased, especially at a die temperature of room temperature, and are close to the green densities of the finished and sintered molded part.

Compositions in accordance with certain aspects of the invention can contain additional components, particularly lubricants, especially in an amount of 0.2 to 5 wt. %, based on the total amount of the composition. Lubricants that can be used include self-lubricating agents, for example, $MoS_2$, $WS_2$, BN, MnS, as well as graphite and/or other carbon modifications, such as coke, polarized graphite, or the like. Preferably, 1-3 wt. % of the lubricant is added to the sinterable composition. Self-lubricating properties can be imparted to the molded parts produced from the sinterable composition through the use of the aforementioned lubricant(s).

The composition of the invention can also contain other lubricants such as AEROSIL®-based dispersions. The compositions of the present invention can be produced by mixing the individual components with standard equipment, such as asymmetric moved mixers. The mixing can be carried out either at elevated temperatures (hot mixing) or at room temperature (cold mixing), but hot mixing is preferred.

Preferred compositions contain polyglycols in amounts of 30-55 wt. %, and especially 32-53 wt. %, and montan waxes in amounts of 45-70 wt. %, based in each case on the total amount of the pressing aid.

It is advantageous to use polyethylene glycols as the polyglycols contained in the pressing aid of the composition of the invention. In the context of this invention, polyethylene glycols also include compositions of polyethylene glycols of various molecular weights. It is especially advantageous to use polyethylene glycols with a molecular weight in the range of about 100 to 20,000 g/mole, preferably 100 to 7,000 g/mole, more preferably 100 to 6,500 g/mole, and most preferably 3,000 to 6,000 g/mole. Without being limited by theory, it is believed that the great advantage of the specified polyethylene glycols lies in the fact that they have a relatively low softening point, generally in the range of 40°-100° C., which makes it possible to fill the dies used in the metallurgical process with cold material, so that lumping, agglomeration, or the like is avoided. When the die is heated in the pressing operation, the selected polyethylene glycols, together with the montan waxes that are used, allow lubrication, so that higher green densities and green strengths of the green compacts are achieved.

It is advantageous for the montan waxes of the pressing aid used in the composition of the invention to contain fatty acid esters based on $C_{24}$-$C_{34}$ fatty acids.

Certain embodiments of the present invention also concerns methods for the production of the composition of the invention, in which in a first step, the polyglycols and montan waxes that compose the pressing aid are melted together; and in a second step, the pressing aid produced in the first step is added to the metallic and/or polymer material.

In a preferred embodiment of the method of the invention, after the first step, the melt that has been produced is cooled and then ground or atomized. Surprisingly, it was found that the method of the invention results in green strengths of the green compacts that are significantly greater than those that can usually be achieved with pressing aids currently known in the art.

In yet another alternative method of the invention, in a first step, the polyglycols and montan waxes that compose the pressing aid are mixed together; and in a second step, the pressing aid produced in the first step is added to the metallic and/or polymer material.

The green compacts obtained after the metallurgical pressing operation with this alternative method also have green strengths that are greater than those obtained with customary prior-art pressing aids. Furthermore, the present invention concerns the use of the composition of the invention for the production of sintered molded parts.

The present invention also concerns green compacts produced from the composition of the invention, which have a green strength, as determined in accordance with ISO 3995-1985, of greater than 7.55 $N/mm^2$ at a die temperature of room temperature and a pressure of 600 MPa. In addition, it is advantageous for the green compacts of the invention to have a green density, as determined in accordance with ISO 3927/1985, of at least 7.14 $g/cm^3$ at 800 MPa and a die temperature of room temperature.

These and other advantages of the present invention are described on the basis of the following examples. It will be appreciated by one skilled in the art that the descriptions given herein are for exemplary purposes only and is not intended in any way to limit the scope of the invention.

EXAMPLES

Compositions were produced from the sinterable metal powder Ancorsteel 85 HP produced by Hoeganaes Corporation, USA, with 0.65 wt. % carbon and 0.6 wt. % of the following pressing aids, based in each case on the total amount of the composition:

(a) Licowax® C, Clariant GmbH, Frankfurt am Main, which is a bisstearoylethylenedi-amine (amide wax);

(b) Acrawax® C, Lonza AG, Basel, Switzerland, which is an N,N'-ethylenebisstearamide (amide wax);

(c) Kenolube® P11, Höganäs AB, Höganäs, Sweden, which is a composition of 22.5 wt. % zinc stearate and 77.5 wt. % of an amide wax;

(d) Polyglycol 6000 PF, Clariant GmbH, Frankfurt am Main, which is a polyethylene glycol with a molecular weight of about 6,000 g/mole;

(e) Licowax® E, Clariant GmbH, Frankfurt am Main, which is a montan wax composed of esters of $C_{24}$-$C_{34}$ fatty acids with an acid value (mg KOH/g) in the range of 15-20 and a saponification number in the range of 130-160;

(f) a composition of 67 wt. % Licowax® E and 33 wt. % Polyglycol 6000 PF, based in each case on the total amount of the pressing aid; this composition was produced by melting the montan wax and the polyethylene glycol together, solidifying the melt, possibly followed by cooling (e.g., with liquid nitrogen), and then grinding the solidified melt to a powder;

(g) a composition of 50 wt. % Licowax® E and 50 wt. % Polyglycol 6000 PF, which was produced by melting the montan wax and the polyethylene glycol together, solidifying the melt, possibly followed by cooling (e.g., with liquid nitrogen), and then grinding the solidifed melt to a powder;

(h) a composition of 67 wt. % Licowax® E and 33 wt. % Polyglycol 6000 PF, which was mixed in a standard asymmetric moved mixer without first melting the components together;

(i) a composition of 50 wt. % Licowax® E and 50 wt. % Polyglycol 6000 PF, which was mixed in a standard asymmetric moved mixer without first melting the components together; based in each case on the total amount of the pressing aid. As an alternative to grinding the compositions in accordance with (f) and (g), the melt can also be atomized.

The amount of pressing aid added can generally be in the range of about 0.1 to 5 wt. %, preferably 0.3 to 3 wt. %, and even more preferably 0.5 to 1.5 wt. %, based on the total amount of the composition of the invention.

The specified compositions were introduced into a standard die and pressed into cylinders with a diameter of 14.3 mm and a length of 12 cm at various pressures (400, 600, and 800 MPa). The physical properties of the green compacts obtained in this way are given in Tables 1 and 2. The values in Table 1 are based on a die temperature of 20° C. (room temperature), and the values in Table 2 are based on a die temperature of 70° C.

TABLE 1

| Properties at Room Temperature | (a) | (b) | (c) | (d) | (e) | (f) | (g) | (h) | (i) |
|---|---|---|---|---|---|---|---|---|---|
| flow time (s/50 g) | 27.20 | | | 27.80 | 28.12 | 27.37 | 26.10 | 27.43 | 27.09 |
| bulk density (g/cm³) | 2.94 | | | 2.91 | 2.98 | 2.96 | 2.97 | 2.97 | 2.98 |
| green strength (MPa) at p = 600 MPa | 6.50 | | | 7.50 | 7.20 | 8.00 | 7.60 | 7.50 | 7.80 |
| green density (g/cm³) at 400 MPa | 6.70 | 6.67 | 6.68 | 6.69 | 6.75 | 6.76 | 6.79 | 6.74 | 6.75 |
| green density (g/cm³) at 600 MPa | 6.99 | 7.01 | 7.02 | 6.98 | 7.01 | 7.02 | 7.07 | 7.06 | 7.05 |
| green density (g/cm³) at 800 MPa | 7.07 | 7.13 | 7.14 | 7.09 | 7.11 | 7.14 | 7.16 | 7.18 | 7.17 |

TABLE 2

| Properties at 70° C. | (a) | (b) | (c) | (d) | (e) | (f) | (g) | (h) | (i) |
|---|---|---|---|---|---|---|---|---|---|
| flow time (s/50 g) | 27.20 | | | 27.80 | 28.12 | 27.37 | 26.10 | 27.43 | 27.09 |
| bulk density (g/cm³) | 2.94 | | | 2.91 | 2.98 | 2.96 | 2.97 | 2.97 | 2.98 |
| green strength (MPa) at p = 600 MPa | 8.50 | | | 22.80 | 15.60 | 17.00 | 17.10 | 18.30 | 19.70 |
| green density (g/cm³) at 400 MPa | 6.73 | 6.75 | 6.79 | 6.89 | 6.89 | 6.90 | 6.93 | 6.91 | 6.92 |
| green density (g/cm³) at 600 MPa | 7.09 | 7.10 | 7.15 | 7.18 | 7.19 | 7.19 | 7.21 | 7.23 | 7.22 |
| green density (g/cm³) at 800 MPa | 7.11 | 7.20 | 7.23 | 7.26 | 7.27 | 7.26 | 7.27 | 7.27 | 7.25 |
| Surface | dry | dry | dry | wet | dry | dry | dry | sticky | sticky |

The values reproduced in Tables 1 and 2 are the mean values of three measurements. The physical properties specified in Tables 1 and 2 were determined in accordance with ISO 3923-1979 for the bulk density, ISO 4490-1978 for the flow time, ISO 3927-1985 for the compressibility, and ISO 3995-1985 for the green strength. As Tables 1 and 2 show, the green compacts produced from the compositions (f) to (i) have not only high green strength values but also high green density values. These compositions are clearly superior to the compositions that contain the prior-art pressing aids (compositions (a), (b), and (c)), but they are also superior to the compositions that contain either only a polyethylene glycol as the pressing aid (composition (d)) or only a montan wax as the pressing aid (composition (e)).

In addition, the die ejection force was determined for the green compacts produced from compositions (a) to (i). These values are reproduced in Tables 3 and 4. Table 3 shows the values of the die ejection force at a die temperature of room temperature (20° C.), while Table 4 shows the die ejection force values determined at a die temperature of 70° C.

TABLE 3

| Die ejection force (at room temperature) | (a) | (b) | (c) | (d) | (e) | (f) | (g) | (h) | (i) |
|---|---|---|---|---|---|---|---|---|---|
| at 400 MPa | 163 | 166 | 154 | 171 | 170 | 156 | 128 | 145 | 138 |
| at 600 MPa | 252 | 257 | 199 | 242 | 221 | 214 | 169 | 207 | 184 |
| at 800 MPa | 351 | 354 | 260 | 301 | 250 | 218 | 197 | 211 | 205 |

TABLE 4

| Die ejection force (at 70° C.) | MW (a) | AW (b) | Keno (c) | SP (d) | XXL (e) | M67 (f) | M50 (g) | B67 (h) | B50 (i) |
|---|---|---|---|---|---|---|---|---|---|
| at 400 MPa | 153 | 1148 | 143 | 127 | 131 | 121 | 120 | 118 | 127 |
| at 600 MPa | 221 | 215 | 184 | 188 | 180 | 147 | 134 | 153 | 130 |
| at 800 MPa | 294 | 300 | 195 | 193 | 209 | 151 | 142 | 162 | 145 |

Tables 3 and 4 show that the die ejection forces of green compacts produced from compositions (f) to (i) are significantly reduced compared to those of green compacts produced from compositions (a) to (e). The die ejection force is about 25% lower here. This places much less stress on the dies that are used, so that their wear is reduced and their service life is increased. Furthermore, the green compacts produced in this way show virtually no localized after-compaction or cracks.

Thus, presently preferred embodiments of the invention make available a composition which reduces two prevalent disadvantages of previously known compositions in a single composition. Specifically, the compositions of the invention makes it possible to achieve high green strengths and high green densities of the green compacts produced from these compositions. Still further, the die ejection force can be considerably reduced, which results in a longer service life of the die. The quality of the green compacts produced from the compositions of the invention is excellent. The reduced cracking and the reduced development of sites of localized after-compaction ensure qualitatively consistent and high-grade production.

What is claimed:

1. A composition for the production of sintered articles comprising:
   (a) at least one of a metal-based powder, a ceramic-based powder, and a polymer-based powder; and
   (b) a compaction aid, wherein said compaction aid comprises from 25 to 60 weight percent polyglycol, based on the total weight of the compaction aid, and from 40 to 75 weight percent montan wax, based on the total weight of the compaction aid.

2. The composition of claim 1, wherein said compaction aid is present in an amount from about 0.1 to 5 weight percent, based on the total weight of said composition.

3. The composition of claim 1, wherein said compaction aid is present in an amount from about 0.3 to 3 weight percent, based on the total weight of said composition.

4. The composition of claim 1, wherein said compaction aid is present in an amount from about 0.5 to 1.5 weight percent, based on the total weight of said composition.

5. The composition of claim 1, wherein said metal-based powder is an iron-based powder.

6. The composition of claim 1, wherein said metal-based powder is an aluminum-based powder.

7. The composition of claim 1, further comprising at least one lubricant.

8. The composition of claim 7, wherein said lubricant is at least one of $MoS_2$, $WS_2$, BN, $MoS_2$, $WS_2$, BN, MnS, and carbon.

9. The composition of claim 7, wherein said lubricant is from 1 to 3 weight percent of said composition.

10. The composition of claim 7, wherein said lubricant is from 0.2 to 5 weight percent weight of said composition.

11. The composition of claim 1, wherein said montan wax has an acid value of from 5 to 30 mg KOH/g.

12. The composition of claim 1, wherein said montan wax has an acid value of from 10 to 25 mg KOH/g.

13. The composition of claim 1, wherein said montan wax has a viscosity of from 10 to 40 m-Pa, as measured at 100° C.

14. The composition of claim 1, wherein said montan wax has a viscosity of from 15 to 35 m-Pa, as measured at 100° C.

15. The composition of claim 1, wherein said montan wax comprises $C_{24}$-$C_{34}$ fatty acid esters.

16. The composition of claim 1, wherein said polyglycol comprises polyethylene glycol.

17. The composition of claim 16, wherein said polyethylene glycol has a molecular weight of from 100 to 20,000 g/mole.

18. The composition of claim 16, wherein said polyethylene glycol has a molecular weight of from 100 to 7,000 g/mole.

19. The composition of claim 16, wherein said polyethylene glycol has a molecular weight of from 3,000 to 6,000 g/mole.

20. The composition of claim 1, wherein said polyethylene glycol is present in an amount from 32 to 53 weight percent, based upon the total weight of said compaction aid.

21. A green compact comprising the composition of claim 1.

22. The green compact of claim 21, wherein said green compact has a green density of at least 7.14 g/cm³.

23. The green compact of claim 21, wherein said green compact has a transverse rupture strength greater than 7.55 N/mm².

24. A composition for the production of sintered articles comprising:
   at least one of a metal-based powder, a ceramic-based powder, and a polymer-based powder;
   a compaction aid comprising from 25 to 60 weight percent polyglycol, based on the total weight of the compaction aid, and from 40 to 75 weight percent montan wax, based on the total weight of the compaction aid; and at least one of $MoS_2$, $WS_2$, BN, MnS, and carbon.

25. A composition for the production of sintered articles comprising:
   (a) a metal-based powder; and
   (b) a compaction aid, wherein said compaction aid comprises from 25 to 60 weight percent polyglycol, based on the total weight of the compaction aid, and from 40 to 75 weight percent montan wax, based on the total weight of the compaction aid; wherein said montan wax comprises $C_{20}$-$C_{36}$ fatty acid esters.

26. The composition of claim 25 further comprising at least one of $MoS_2$, $WS_2$, BN, MnS, and carbon.

27. A composition for the production of sintered articles comprising:
   (a) an aluminum-based powder; and
   (b) a compaction aid, wherein said compaction aid comprises from 25 to 60 weight percent polyglycol, based on the total weight of the compaction aid, and from 40 to 75 weight percent montan wax, based on the total weight of the compaction aid.

28. The composition of claim 27 further comprising at least one of $MoS_2$, $WS_2$, BN, MnS, and carbon.

29. A compaction aid useful for the production of sintered articles comprising from 25 to 60 weight percent polyglycol, based on the total weight of the compaction aid, and from 40 to 75 weight percent montan wax, based on the total weight of the compaction aid.

30. The compaction aid of claim 29 wherein wherein said montan wax comprises $C_{24}$-$C_{34}$ fatty acid esters and has an acid value of from 10 to 25 mg KOH/g, and wherein said polyglycol comprises polyethylene glycol having a molecular weight of from 100 to 7,000 g/mole.

31. The composition of claim 1, wherein said montan wax comprises $C_{20}$-$C_{36}$ fatty acid esters.

* * * * *

UNITED STATES PATENT AND TRADEMARK OFFICE
CERTIFICATE OF CORRECTION

PATENT NO. : 7,524,352 B2
APPLICATION NO. : 11/089110
DATED : April 28, 2009
INVENTOR(S) : Rene Lindenau, Klaus Dollmeier and Volker Arnhold It is certified that error appears in the above-identified patent and that said Letters Patent is hereby corrected as shown below:

Title Page; (73) Assignee: GKNM Sinter Metals GmbH should read "GKN Sinter Metals GmbH"

Signed and Sealed this

Eighth Day of June, 2010

David J. Kappos
*Director of the United States Patent and Trademark Office*